May 3, 1955      H. J. BARTH      2,707,281
LATEX BRASSIERE WITH A LINING OF FIBERS
Filed Aug. 9, 1952
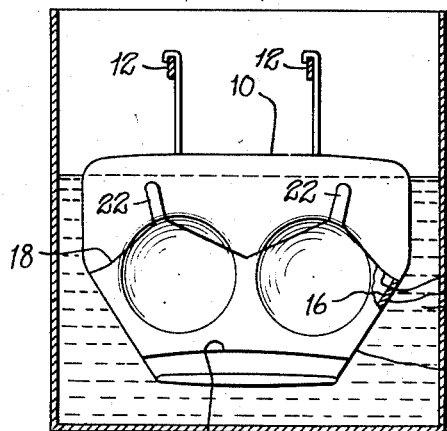
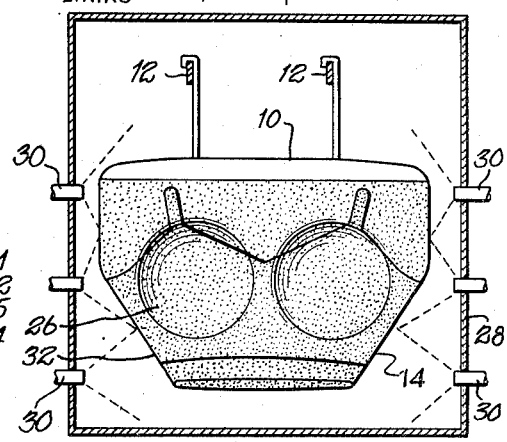
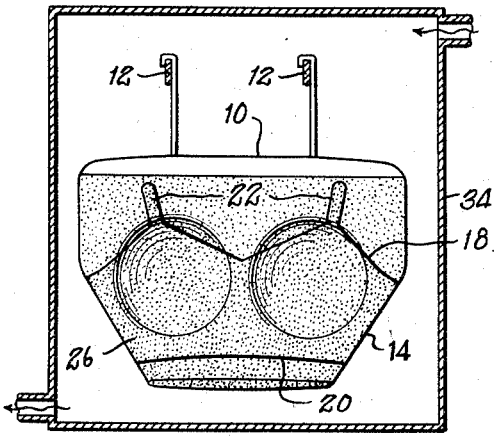
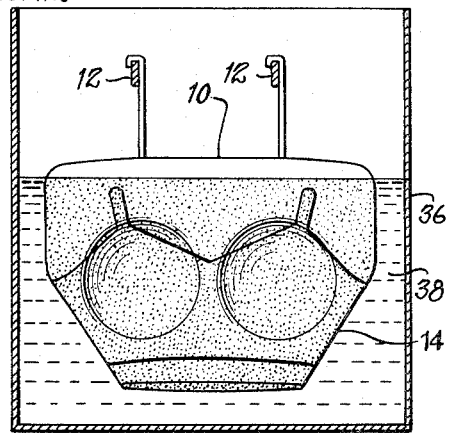
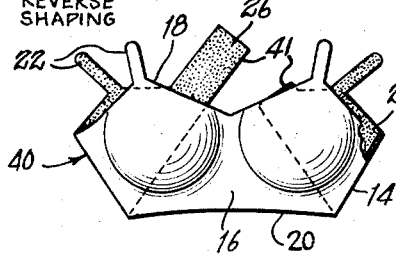
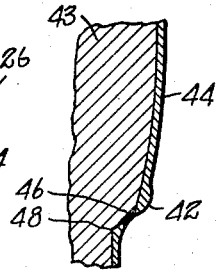
INVENTOR.
HARRY JACOB BARTH.
BY Harry Ernest Rubens
ATTORNEY United States Patent Office 2,707,281
Patented May 3, 1955

2,707,281

LATEX BRASSIÈRE WITH A LINING OF FIBERS

Harry Jacob Barth, Dover, Del., assignor to International Latex Corporation, Dover, Del., a corporation of Delaware Application August 9, 1952, Serial No. 303,505

1 Claim. (Cl. 2—42)

My invention relates to brassières made from deposited rubber latex.

Hitherto various articles have been made from liquid rubber latex and many advantages have been obtained therefrom such as great elasticity and universal stretch, reduced thickness, ability to wash and dry more or less instantly, the freedom from staining, and the freedom from surface irregularities which permit closely fitted clothes to be worn without disfigurement.

Brassières made from liquid rubber latex are more desirable if they are improved by a lining which will enable the letex surface to slide with greater facility over the skin. Such a lining will permit the evaporation of moisture if the body is perspiring, and a lined brassière would therefore be more comfortable to wear than a similar unlined product.

The accomplishment of the foregoing objects are the primary purpose of my invention.

Further objects are the provision of such a lining which will not irritate the skin, which will space the skin from the latex surface throughout the brassière; which will flex with the skin in substantialy the same degree as the thin latex surface; which will not separate from the latex when stretched to the ultimate breaking point of the latex and which will not add to any extent, to the cost of the unlined latex brassière.

Prior methods of securing a lining of fibers to latex articles generally are of little value in forming such a lining on a brassière. If an interwoven fabric is to be employed it will be difficult to provide the universal stretch, or the degree of elasticity obtained from a latex formed article. The differential stretch between lining and article will deprive the latex article of some of its elastic values. If a cement or adhesive is used the differential stretch between a brassière formed from liquid latex and the stretch possible with a cemented lining may cause the layer carrying the adhering fibers to crack and peel and allow particles of the cement to remain on the body when the brassière is removed. In addition when an elastic cement is used as the adhesive, the solvent which is necessarily contained therein may attack the latex material and cause it to swell unevenly, and also loosen on the dipping form.

The principal objection to employing adhesive coatings to the surfaces of the formed brassière is the failure of the adhesive to secure the individual fibers properly. In all my experiments with adhesives for cementing the fibers, it has been found that in nearly every subsequent use of the brassière some of the fibers themselves are loosened and remain on the skin when the brassière is removed. I have discovered that this is particularly true of brassières made from liquid latex and subject to extensive stretching over moist skin.

Some prior art methods disclose the principle of applying the fiber particles directly to the dipping form, and adding the latex to the coated form. These methods are impractical particularly if it is desired to preserve the latex supply free of particles so that displaced fiber particles will not appear on the outside of the finished brassière and disfigure it.

Further objects of my invention are to secure a lining of fibers to a brassière made from liquid latex without the use of adhesive coatings; to secure such a lining by a method which does not bring the fibers into contact with the liquid latex supply, which permits all the attached fibers to be thoroughly embedded in the latex body of the brassière itself; which permits a denser coating of fibers to be obtained; and which is simple and less costly to apply than other known methods.

In the manufacture of brassières made from liquid rubber latex with which I am here concerned, the inside of the formed brassière will appear as the outside of the finished brassière, as the finished brassière in my invention will be turned inside out.

This reversal in normal forming procedure requires a careful study of the surface configuration of the dipping form for all surface configurations must be reversed.

Further complications occur in the manufacture of brassières from liquid rubber latex for it will be noted that upper and lower edges are generally reinforced. Whereas most articles made from liquid rubber latex require a single reinforcing edge which may be provided on the form by gravity, two separate and oppositely positioned reinforcing edges are possible in a brassière, and they must be accounted for in any changes hereinvolved.

A further object of my invention therefore comprises the manufacture of a brassière made from liquid rubber latex that can be reversably formed.

I accomplish these and other objects and obtain new results as will be apparent from the device described in the following specification, particularly pointed out in the claims, and illustrated in the accompanying drawing, in which—

Fig. 1 illustrates my reversed brassière form being dipped into a supply of liquid rubber latex to form the brassière shown partly in section;

Fig. 2 illustrates diagrammatically the form and brassière supported in a chamber containing apparatus for blowing the fibers onto the outside surface of the freshly dipped formed brassière;

Fig. 3 is a diagrammatical illustration of the form and brassière in a drying chamber;

Fig. 4 is a similar view but in a hot water curing vessel;

Fig. 5 illustrates the reverse shaping to produce the final brassière, shown partly in section;

Fig. 6 is an enlarged fragmentary sectional elevation view of a form and a latex brassière forming a reinforcing bead; and Fig. 7 is a similar view of an improvement thereof.

In my process I provide a form 10, supported on the rails 12 for making a dipped latex brassière 14 in an inside-out position. Thus the inside surface 16 of the dipped brassière becomes the outside surface of the final article by final reversing.

In the manufacture of a brassière made from liquid rubber latex it will be noted that upper and lower openings defined by edges 18 and 20, respectively, are required as distinguished from articles provided with a single opening. I am able by my invention to dip my article in an inside-out position, and to produce the special edge reinforcement as will be hereinafter described, which provides maximum protection at the bottom opening 20 of the brassière. The depression on the mold 10 in which the brassière is formed is indicated by the numeral 21.

The brassière tabs 22 for supporting the shoulder straps may be formed directly on the form, and the reinforcement provided at opening 18 continues around the perimeter of the tabs.

The form is thoroughly cleaned before first using and is then dipped, as illustrated in Fig. 1, into a tank 24 of liquid rubber latex compound 25 consisting of, as an example:

| | Parts by weight |
|---|---|
| Natural rubber latex | 75 |
| Emulsion polymer of chlorobutadiene | 25 |
| Sulfated methyl oleate (sodium salt) | 3.0 |
| Aquarex WA (sulfated mono esters of a mixture of higher fatty alcohols) | 1.5 |
| Zinc oxide | 3.0 |
| Titanium dioxide | 10.0 |
| Zinc dimethyldithiocarbamate | 0.5 |
| Di benzothiazyl-dimethyl-thiol urea | 1.0 |
| Sulfur | 2.0 |

The water soluble ingredients are added to the latex mixture as 20% solutions and the water insoluble materials are added as a water dispersion having been dispersed in a manner known in the art.

For making the comminuted fiber lining 26, I may employ cotton filaments of extremely short length of from ½ to 1½ millimeters. These cotton filaments are of small diameter and have great surface area as compared with their mass.

While the absorbency factor is not of great importance with viscous materials, such as are commonly employed for adhesives where the adhering surface contact is all that is substantially obtained, I am primarily concerned with embedding the ends of the cotton fibers directly into a liquid latex film containing a large proportion of water. The fibers, if made of cotton, upon contacting the surface of the liquid latex will instantly absorb large quantities of the moisture causing the liquid latex to become viscous at the surface. The subsequently impinging fibers do not penetrate the viscous surface and are less securely embedded. I have found that for thoroughly embedding all the cotton fibers that are possible it is therefore desirable to have a dipped liquid latex film of maximum thickness on the form. Thus more liquid is provided for maintaining the initial surface viscosity. This is an important factor in the use of absorbent fibers on liquid latex surfaces containing large amounts of water.

If as an example I may employ a film of liquid latex having a variable thickness say of from .003" to .006", I prefer to use the maximum thickness practicable knowing that the degree of fiber embedment and density of secured fibers will be in proportion to the increased thickness, within the limits of the absorbency factor of the fibers.

This is in contrast to adhesives and cements where the viscosity of the adhering coating makes penetration of air borne filaments difficult, for then thickness is no factor since only a surface adhesion is obtained regardless of depth.

After the form has been dipped in the liquid rubber latex compound to the desired thickness, the form is quickly moved into a closed chamber 28 where the cotton fiber filaments 26 are blown through spray nozzles 30 at about 30 lbs./sq. in. pressure against the wet surface 32 of the liquid latex covered form, or at a velocity sufficient to cause the particles to become suitably embedded therein, but at insufficient speed to cause any wave motion in the liquid latex surface. When the maximum number of fibers has been embedded into the wet latex, the form containing the dipped and fiber covered brassière is withdrawn, and placed in a drying chamber 34 through which heated air is circulated until the excess moisture has been removed from the latex. Drying at 150° F. for 30 minutes is sufficient.

Thereafter the coated forms are placed in a curing or vulcanizing bath 36 containing preferably water 38 at just below boiling temperature for 30 minutes or until the latex has been satisfactorily cured. The water will simultaneously wash the lined article free of all loose and soluble matter.

Thereafter such procedures as stripping and tumbling are employed, and any steps applied as are known in the art.

The brassière is finally turned inside-out, to the final shape 40, as shown in Fig. 5, or to the reversed position from that produced on the dipping form as shown in Fig. 1, resulting in a brassière made from liquid rubber latex with a thoroughly secured and dense inner lining of fibers which extends over the whole of the inside of the brassière, including back straps 41.

In the manufacture of a brassière employing this invention, it should be noted that the beadings and edges which may be employed for reinforcement of the brassière to prevent tearing when applied to the body, will be reversed if provided on the form. Thus the outwardly protruding reinforcing bead 42 of the type shown in Fig. 6 will be reversed in position in my process and will therefore project into the skin, when the article is reversed. The bead 42 of Fig. 6, as an example may be formed during the dipping process by holding the form 43 in the same position after removal from the supply of liquid latex, so that the force of gravity will permit a slight exces of the liquid latex 44 to accumulate at the edge 46 of the form. At this edge the form is set back slightly as at 48. The surface tension of the accumulated liquid latex will cause the bead 42 to form, reinforcing the edge of the thin latex brassière and thus prevent tearing.

In carrying out my present invention which reverse-shapes the brassière such a bead would be caused to project into the skin. To prevent such occurrence, I may obliquely cut back as at 50, the former edge 46, in the new type form 52 which may be shaped as shown in Fig. 7. The cut-back is for approximately the same distance as the bead formerly protruded, so that the effect is to form the new bead 54 below the cut-back 50. The former edge 46 is now replaced by the edge 56. This construction will reverse the direction of protrusion in the latex 58, with respect to the ultimate inner surface, or the outside of the brassière as formed.

The brassière is then reverse-shaped, and the new type reinforcing bead will extend away from the body and will not mark the skin.

An important manufacturing step in dipping simultaneously a plurality of forms is to cause the forms to be as close to each other as possible during dipping. This arrangement benefits production. However, the forms should be separated as far as feasible when the lining of fibers is applied in order to insure that the greatest number of fiber particles are applied, and said fibers applied as nearly normal to the surface of the liquid latex film as conditions permit.

Instead of short cotton fibers, other vegetable or animal fibers may be used. In addition synthetic fibers such as rayon, may be employed advantageously.

I have thus illustrated one method of producing a novel brassière with an inner lining of fibers which provides an air cushion between the latex formed brassière and the skin. On this air cushion the brassière can be easily slipped on and off the body whether the skin is dry or moist.

The brassière when worn has unexpected advantages. The movement of the flesh on the lining of fibers causes the air cushion to "breathe" and to expel the moisture evaporating from the body and the heat from the skin. A brassière lined with fibers thus becomes cooler to wear in summer, while the impermeable latex makes the brassière warm to the body in the winter.

The ease with which a latex brassière may be washed and dried is maintained as a practical matter. The exposed ends of the fibers having maximum surface exposure for their mass, easily dry out when the brassière lining is exposed by reversal.

The advantages of a brassière made from liquid latex have thus been retained while adding the advantages of an absorbent air cushion. Even the straps or connecting sections may be provided with a lining of fibers so that an unbroken area of contact of soft fiber with the skin is maintained.

The shoulder strap fastening elements, not shown, are added to the tabs in a manner known to the art.

By reversing the manufacturing procedure of forming the brassière, I am thus able to form the brassière with its inside surface on the outside, and secure a lining of fibers directly to and in the body wall by embedding portions of the fiber in the liquid latex surface of the brassière before it is dried on the form.

I have thus eliminated the shortcomings previously believed necessary, such as applying a separate adhesive or cement to the form and securing the fibers to the adhesive before dipping into the liquid latex bath. In my process the liquid latex bath is free of fiber particles which enables me to produce a final outside surface of smooth latex without evidence of the fiber particles. In addition, I eliminate the added step of applying adhesives which involves extra equipment and separate application and drying operations.

Finally by properly preparing the surface of the form, it is possible to produce articles which when turned inside out are completely ready for use and do not require added steps of applying reinforcement edges or layers and which possess the necessary external surface configurations required of the finished article. A considerable saving in manufacturing cost is thus effected.

The brassière of my invention is preferably provided with a perspiration resisting rubber compound as is fully disclosed in my concurrently filed application entitled: Deposited Latex Brassière, Serial No. 303,504. In such instance the special compound may be provided in a final dip to which the fibers are secured. Thus when the brassière is reversed, full protection of the latex in contact with the skin is obtained.

Further details of the forms and method of dipping are disclosed in my concurrently filed application entitled: The Art of Making Preformed Deposited Brassières, Serial No. 303,503, and the brassière itself more fully described in the concurrently filed application of Lois A. Spanel et al., entitled: Preformed Latex Brassière, Serial No. 303,501.

I have thus described my invention, but I desire it to be understood that it is not confined to the particular forms or uses shown and described, the same being merely illustrative, and that the invention may be carried out in other ways without departing from the spirit of my invention, and, therefore, I claim broadly the right to employ all equivalent instrumentalities coming within the scope of the appended claims, and by means of which, objects of my invention are attained and new results accomplished, as it is obvious that the particular embodiments herein shown and described are only some of the many that can be employed to attain these objects and accomplish these results.

I claim:

A brassière comprising back straps and breast portions made of deposited latex material, said breast portions each having an outwardly extending preformed cup for elastically supporting the breast and having on the inner surface thereof a dense lining of short fibers individually movable apart from each other when the latex material is stretched, said fibers being located solely in the surface of said deposited latex material, the outer surface of the brassière being a replica of the surface of the form on which said brassièe was made.

References Cited in the file of this patent

UNITED STATES PATENTS

| | | |
|---|---|---|
| 1,492,953 | Bender | May 6, 1924 |
| 2,033,065 | Galligan | Mar. 3, 1936 |
| 2,273,995 | Rogerson et al. | Feb. 24, 1942 |
| 2,428,127 | Sidnell | Sept. 30, 1947 |
| 2,636,173 | Barth | Apr. 28, 1953 |

FOREIGN PATENTS

| | | |
|---|---|---|
| 538,935 | Great Britain | Aug. 21, 1941 |